United States Patent [19]
Goldsmith

[11] Patent Number: 5,826,850
[45] Date of Patent: Oct. 27, 1998

[54] ROTATABLE AND TRANSFERABLE STANCHION ASSEMBLY HAVING A RELEASABLE LOCK

[75] Inventor: Howard G. Goldsmith, South Kingstown, R.I.

[73] Assignee: Chem-Tainer Industries, Inc., North Babylon, N.Y.

[21] Appl. No.: 798,801

[22] Filed: Feb. 12, 1997

[51] Int. Cl.[6] .................................................. A47B 91/00
[52] U.S. Cl. ...................... 248/415; 248/188.8; 248/501; 108/150; 403/199; 403/263
[58] Field of Search ................................ 248/188.8, 500, 248/501, 151, 176; 108/150; 403/190, 199, 194, 197, 263; 114/194, 195; 297/344.22

[56] References Cited

U.S. PATENT DOCUMENTS

| | | | |
|---|---|---|---|
| 3,230,908 | 1/1966 | Grant | 248/418 X |
| 3,348,797 | 10/1967 | Turbyfill | 248/188.1 X |
| 3,415,475 | 12/1968 | Goodman | 248/188.1 X |
| 3,865,050 | 2/1975 | Cecchetti | 248/188.8 X |
| 4,655,632 | 4/1987 | Smith | 248/418 X |
| 4,662,591 | 5/1987 | Encontre | 248/188 |
| 4,848,245 | 7/1989 | Piretti | 248/188.8 X |
| 5,026,010 | 6/1991 | Camarota | 248/188.1 |
| 5,121,891 | 6/1992 | Goldsmith . | |
| 5,383,644 | 1/1995 | Huse | 248/501 X |

*Primary Examiner*—Ramon O. Ramirez
*Assistant Examiner*—Long Dinh Phan
*Attorney, Agent, or Firm*—Salter & Michaelson

[57] ABSTRACT

A rotatable and transferable stanchion assembly includes an elongate body having an upper end portion adapted to receive and secure thereto an accessory, and a lower end portion. A cap is mounted on the lower end portion of the body and has a lower portion with an outer external surface. A location plate, which is fastened to a flat surface, has a socket formed therein shaped for receiving the lower portion of the cap. A stud and bolt assembly secure the cap to the location plate in such a position that the lower portion of the cap is disposed within the socket of the location plate wherein the body and cap are adapted to rotate relative to the location plate. A locking plate of the present invention rotatably locks the elongate body and cap in place with respect to the location plate at a desired angle of rotation.

14 Claims, 4 Drawing Sheets

ROTATABLE AND TRANSFERABLE STANCHION ASSEMBLY HAVING A RELEASABLE LOCK

BACKGROUND AND SUMMARY OF THE INVENTION

This invention relates generally to transferable stanchion systems, and more particularly to a rotatable and transferable stanchion assembly which allows a piece furniture mounted thereon, e.g., a chair or table, to rotate about its stanchion and be locked in a desirous position.

There are many situations in industrial, commercial, and recreational activities where it is desirable to be able to move elements from one place to another and quickly fasten them in that location. An example of this type of manipulation is on board a boat, ship or yacht. In a yacht, for instance, it is desirable to be able to move furniture, such as a table or chair, from one location to another, and to secure it at each location against movement of the vessel. Due to the limited amount of space on most vessels, it is not practical to provide several tables and/or chairs that are permanently fastened to the deck or cabin sole of the vessel.

In the past, a system has been used that involves providing several permanently fastened sockets throughout the vessel. The table or chair is provided with a single leg or stanchion that fits into any selected socket for use at a selected location. This type of device is shown and described, for instance, in U.S. Pat. No. 4,925,140 to Camarota in which the leg frictionally engages the selected socket. Such systems for the transfer of furniture can also be used for other types of accessories, or articles, such as compass binnacles, where it is desirable to remove and store the item when it is not being used.

Unfortunately, these known systems for providing for the removal and transfer of articles have suffered from a number of defects. Among several difficulties encountered with the prior art systems, such as the one disclosed in Camarota, is the fact that the socket and stanchion tend to wear and deform, thus causing them to fit loosely. In a ship or yacht, such looseness is impermissible, because the motion of the vessel and the movement of the stanchion bring about accentuated motion of the piece of furniture mounted thereon.

These and other difficulties experienced with the prior art devices have been obviated in a novel manner by the stanchion system disclosed in U.S. Pat. No. 5,121,891 to Goldsmith, the inventor of the present invention. In this patent, there is disclosed a stanchion system having an elongate body upon which the accessory is mounted (e.g., a table), a cap mounted at the lower end of the body, and a location plate which is fastened on the surface upon which the accessory is located (e.g., the vessel's deck). The cap has an external surface which is tapered, and the location plate has a socket shaped to receive the cap snugly therein. The arrangement is such that by securing the cap and elongate body to the location plate, the cap is drawn into the socket to lock them tightly together.

However, depending upon how tight the connection between the cap and location plate, this arrangement can allow for the relative rotation between the cap and elongate body combination and the location plate. When mounting a chair on the body, for example, it is desirable to rotate the chair so as to change its user's point of view. One disadvantage of the known stanchion systems, including Goldsmith's, is that it is sometimes necessary to lock the chair in place so that it is incapable of rotating. In fact, new boating regulations may some day require such a feature. Thus, there is presently a need for a stanchion system which enables the accessory upon which the body of the system receives to rotate, but is capable of locking the accessory in place to prevent such rotation.

In general, the present invention is directed to a rotatable and transferable stanchion assembly comprising an elongate body having an upper end portion adapted to receive and secure thereto an accessory, and a lower end portion. A cap is mounted on the lower end portion of the body and has a lower portion with an outer external surface. A location plate, adapted to be fastened to a flat surface, has a socket formed therein shaped for receiving the lower portion of the cap. A stud and bolt assembly secure the cap to the location plate in such a position that the lower portion of the cap is disposed within the socket of the location plate wherein the body and cap are adapted to rotate relative to the location plate. Locking means of the present invention rotatably locks the elongate body and cap in place with respect to the location plate at a desired angle of rotation.

More specifically, the locking means comprises engaging means associated with the location plate for securely engaging the cap to prevent the relative rotation of cap and body with respect to the location plate. The engaging means comprises a locking plate pivotally connected to the location plate for engaging the cap, the locking plate having a hinge for connecting the locking plate to the location plate, a lever for moving the locking plate between a position in which it is engages the cap and a position in which it is disengaged therefrom, and an inwardly extending detent. The cap has a circumferential flange with teeth formed thereon, the detent being received between teeth of the circumferential flange for locking the cap and body in place with respect to the location plate. Spring means biases the locking plate in its engaged position.

Accordingly, an outstanding object of the present invention is that of a rotatable and transferable stanchion assembly which is capable of being transferred from one location to another aboard a vessel.

Another object of this invention is the provision of such a stanchion assembly which can be rotated (thereby rotating a piece of furniture mounted thereon, e.g., a chair) and locked in place once a desired angle of rotation is achieved.

A further object of the present invention is the provision of such a stanchion assembly that can be quickly and easily secured in one of several selected locations, and quickly and easily rotated and locked in place to a preselected angle of rotation with little physical effort.

A still further object of the present invention is the provision of a stanchion assembly having a releasable lock which is reliable in use and conveniently located.

Another object of the invention is the provision of such a stanchion assembly which is simple and rugged in construction, which can be easily manufactured from readily-available materials, and which is capable of a long life of use with minimum maintenance.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

Corresponding reference numerals designate corresponding parts throughout the several views of the drawings.

DETAILED DESCRIPTION OF THE PREFERRED EMBODIMENTS

Figure 1:
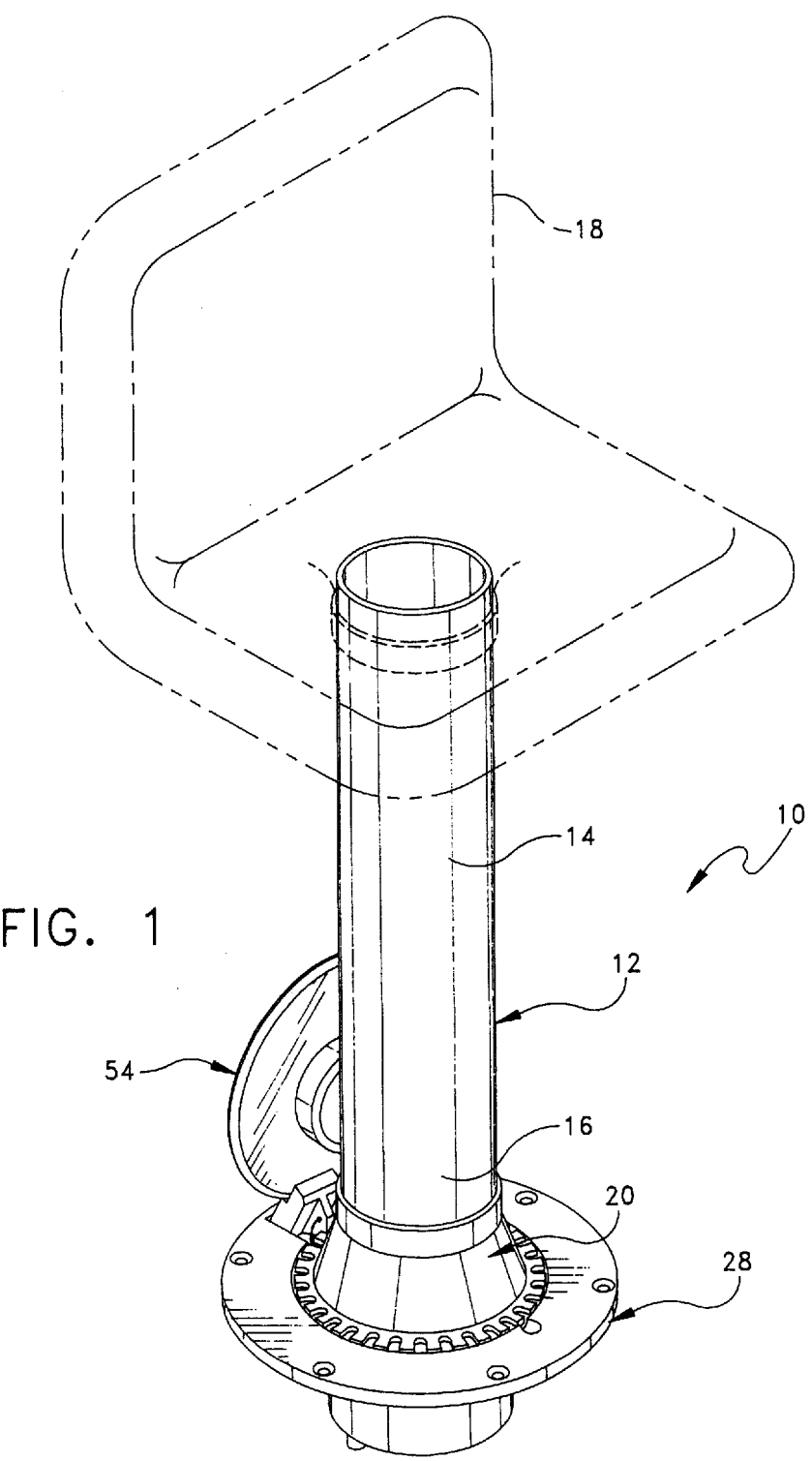
FIG. 1 is a perspective view of a rotatable and transferable stanchion assembly having a lock of the present invention.

Referring now to the drawings, and more particularly to FIG. 1, there is generally indicated at 10 a rotatable and transferable stanchion assembly of the present invention. As shown, the assembly 10 comprises an elongate tubular main body or stanchion, generally indicated at 12, having an upper end portion 14 and a lower end portion 16. The upper end portion 14 of the main body 12 carries thereon an accessory 18, such as a chair, which is attached thereto in any suitable matter. The Goldsmith patent discloses one preferable method of attachment whereby the main body 12 of the assembly has at its upper end portion 14 a tapered end cap or adapter which frictionally and wedgingly engages into a tapered socket provided in a fitting that is secured to the underside of the chair 18. This method of attachment is well-known in the art, and suitable for the present application of the stanchion assembly 10, i.e., mounting the chair thereon.

At the lower end portion 16 of the main body 12, it is provided with a cap, generally indicated at 20, having a frusto-conically-shaped body 22 and a circumferential flange 24 having teeth 26 formed therein, the purpose of which will become apparent as the detailed description continues. A location plate, generally indicated at 28, is fastened to a deck 30 (illustrated in broken lines in FIG. 3) of a vessel by screw fasteners 32. The location plate 28 has an outwardly extending flange 34 and a socket 36 which is shaped to receive the aforementioned body 22 of the cap 20 in close-fitting relationship. It should be understood that suitable openings (not shown) are provided in the vessel's deck 30 through which the socket 36 of the location plate 28 extends. As shown, the arrangement is such that the underside of the location plate's flange 34 engages the deck 30 and the socket 36 extends through the opening in the deck.

Figure 2:
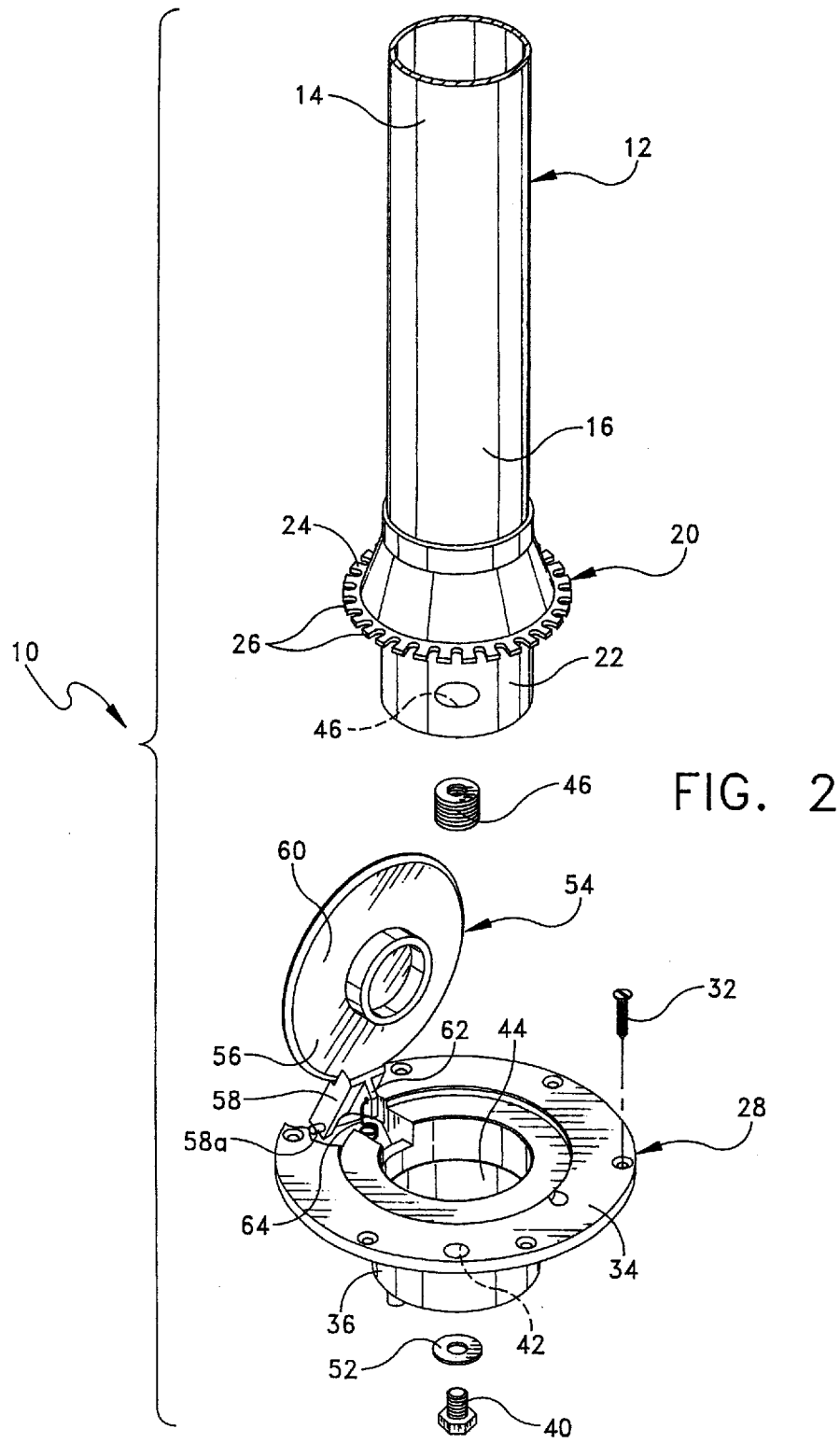
FIG. 2 is an exploded perspective view thereof.
Figure 3:
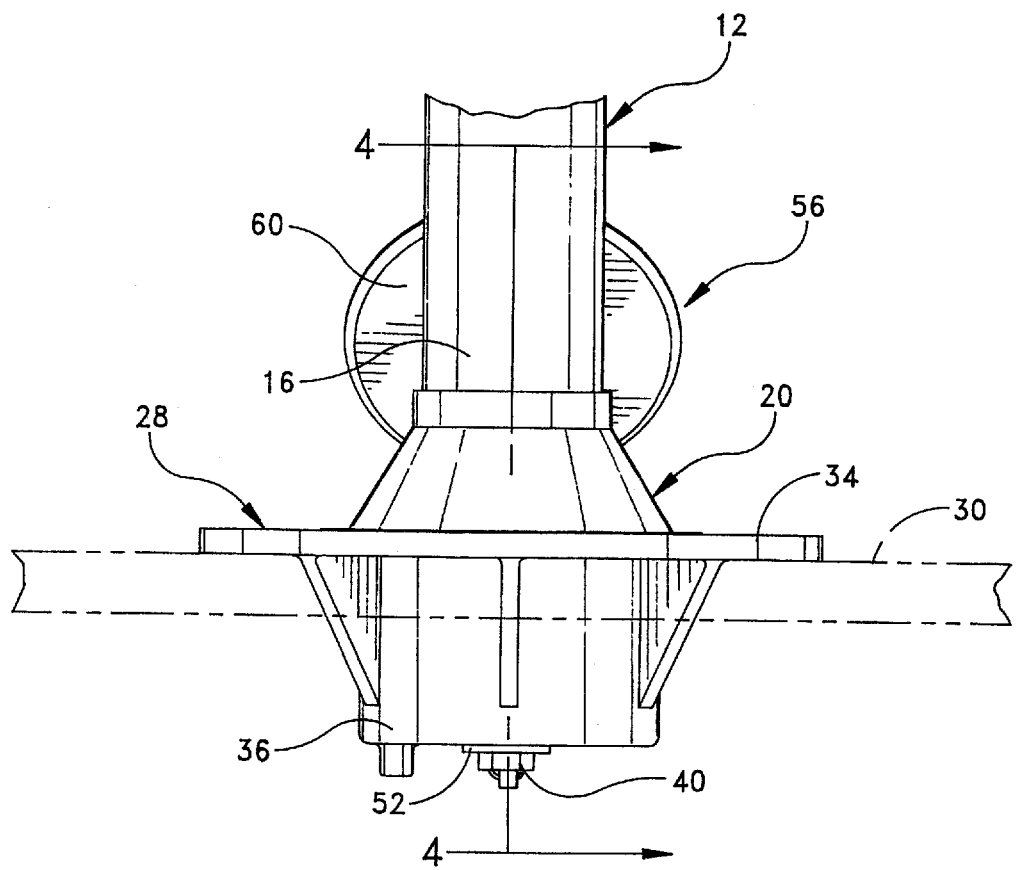
FIG. 3 is a side elevational view of the stanchion assembly.
Figure 4:
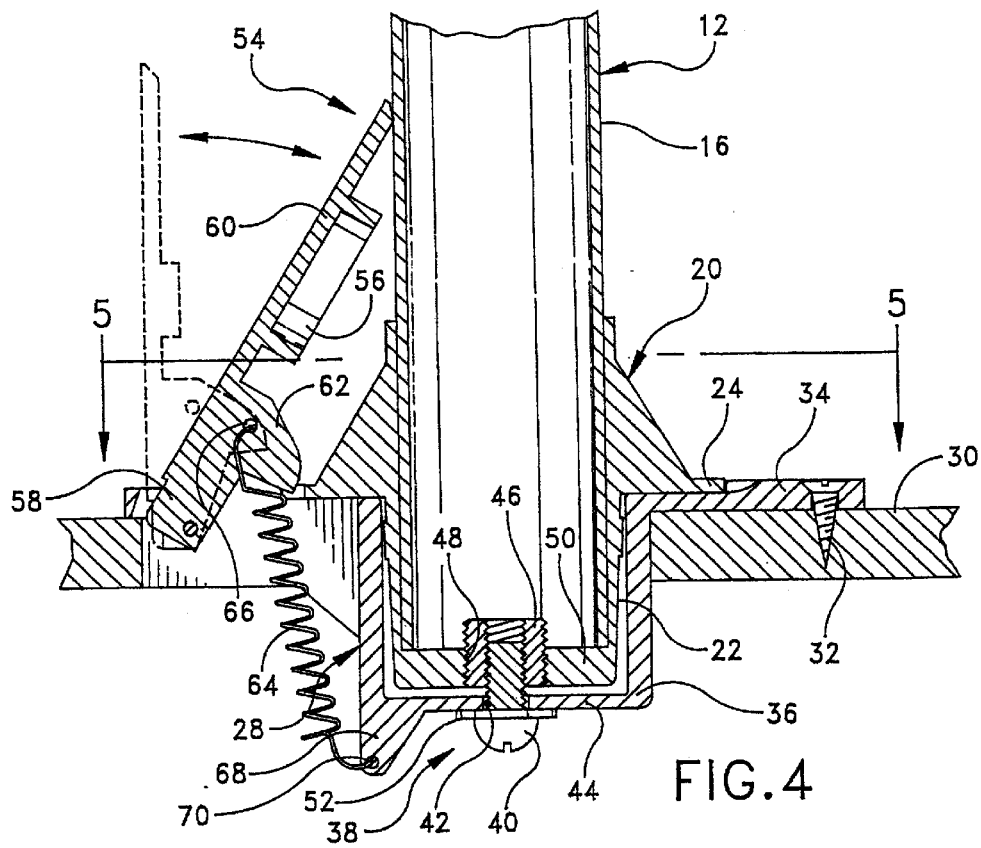
FIG. 4 is a cross-sectional view taken along line 4—4 of FIG. 4.

Referring to FIGS. 2–4, cap securing means, generally indicated at 38 in FIG. 4, joins the cap 20 to the location plate 28 for locking them tightly together. The cap securing means 38 includes a bolt 40 which extends through an aperture 42 in the bottom wall 44 of the socket 36. The cap securing means 38 also includes a threaded stud 46 having external threads. The threaded stud 46 is fixed to the bottom wall 44 of the socket 36 so as to extend upwardly therefrom, in order that it's external threads may be threadedly engaged by an internally threaded bore 48 formed in a bottom wall 50 of the cap 20.

Referring particularly to FIG. 4, the stud 46 also has an internally threaded bore into which the bolt 40 is threaded to secure the stud to the bottom wall 44 of the socket 36 of the location plate 28. The bottom wall 44 of the socket 36 is actually clamped between the head of the bolt 40 and a washer 52 and the bottom of the stud 46. The arrangement is such that it is possible to approach any selected location plate 28 provided in the deck 30 with the accessory 18 and main body 12 combination and quickly lock them to the location plate 28. More particularly, the main body 12 is turned to screw the threaded bore 48 of the cap 20 onto the threaded stud 46. Eventually, the cap 20 is drawn into a position in the socket 36 of the location plate 28 where its body 22 is tightly engages the socket. At that time the flange 24 of the cap 20 is drawn into contact with the location plate 28. It should be noted that this arrangement also allows for the relative rotation of the main body 12 and cap 20 with respect to the location plate 28. Thus, for an assembly 10 carrying a chair thereon, the chair can rotate when exerting a nominal rotational force thereon to position the chair at a desired angle of rotation.

For locking the cap 20 and the main body 12 (and the accessory 18, for that matter) in place, a locking assembly, generally indicated at 54, is provided. The locking assembly 54 comprises means, associated with the location plate 28, for engaging the cap 20 to prevent the relative rotation of the cap 20 and body 12 with respect to the location plate 28. More specifically, the locking assembly 54 comprises a locking plate 56 which is pivotally connected to the flange 34 of the location plate 28 by a hinge 58. The hinge 58 includes a pair of oppositely extending pins 58a (FIG. 2 and 5) which are received in bores 58b (FIG. 5) formed in the flange 34 of the location plate 28 for allowing the pivotal movement of the locking plate 56. The locking plate 56 further includes a circularly-shaped lever 60 integrally formed with the hinge 58 for moving the locking plate 56 between a position in which it engages the cap 20 and a position in which it is disengaged therefrom (illustrated in broken lines in FIG. 4). The locking plate 56 also has an inwardly extending detent 62 which extends along a plane generally perpendicular to the plane of the lever 60.

Figure 5:
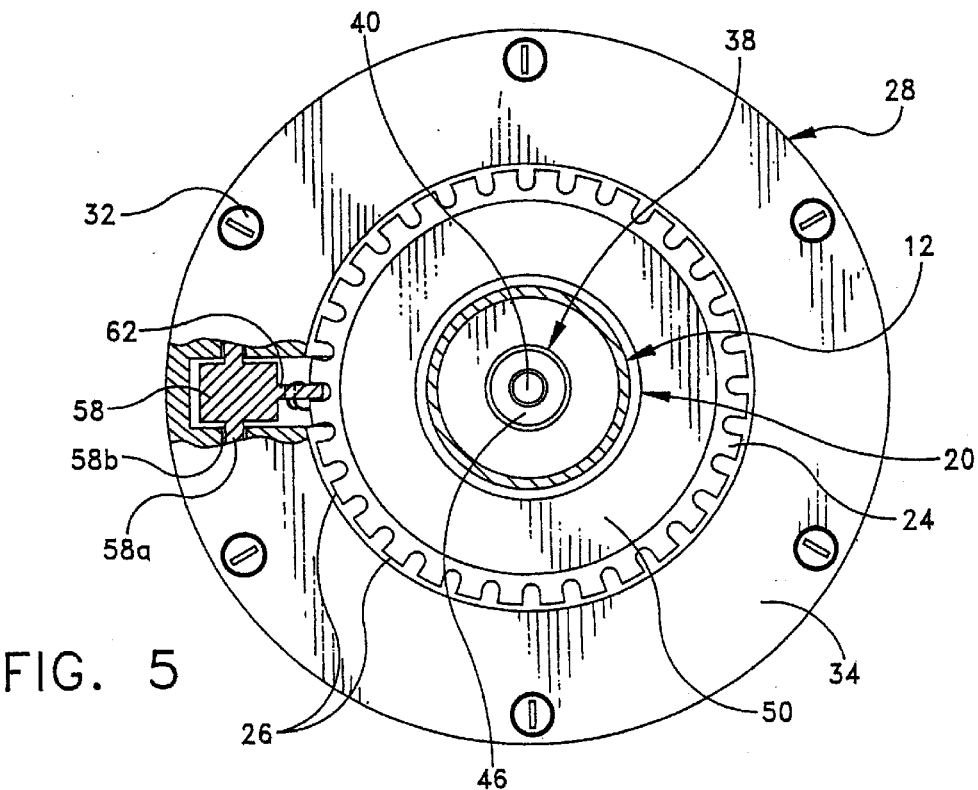
FIG. 5 is a cross-sectional view taken along line 5—5 of FIG. 5.

As mentioned above, the locking assembly, as best shown in FIGS. 4 and 5, further has the aforementioned teeth 26 formed in the circumferential flange 24 of the cap 20 around its outer periphery for receiving the detent 62 of the locking plate 56 between a pair of adjacent teeth to lock the cap 20 and main body 12 in place with respect to the location plate 28. As shown, the main body 12 and cap 20 can be rotated to a desired position (therefore orientating a chair 18 mounted thereon at the body's upper end portion 14), and by inserting the detent 62 of the locking plate 56 between a pair of teeth 26, the assembly 54 is locked, and relative rotation between the main body 12 and cap 20 and the location plate 28 is prevented.

The locking assembly 54 further includes a spring 64 which is attached at one end thereof to the detent 62 via an opening 66 formed therein, and at its other end to a protrusion 68 via an opening 70 formed therein (see FIG. 4). The spring 64 biases the locking plate 56 to its engaged position with the cap 20. Thus, after selecting a desired angle of rotation and releasing the lever 60 of the locking plate 56, the locking plate 56 is moved by the spring 64 towards the teeth 26 of the cap 20 (i.e., its engaged position). Once the detent 62 is inserted between a pair of teeth 26 of the cap's flange 24, the spring 64 maintains its engaging force thereby preventing the inadvertent removal of the detent 62 therefrom which may be caused by rough waters and the like, for example.

Turning now to FIGS. 3 and 4, and particularly to FIG. 3 for now, the lever 60 has a diameter (widthwise dimension) greater than that of the diameter (widthwise dimension) of the main body 12. This facilitates the movement of the locking plate 56 to its disengaged position. As shown in FIG. 4, the locking plate 56, in its engaged position, is engaging, or nearly engaging, the main body 12. Thus, when moving the locking plate 56 to its disengaged position, the fact that the lever 60 is wider than the diameter of the main body 12 enables the person sitting on the chair 18, for example, to reach down and easily move the lever 60 to its disengaged position whereupon the user can rotate the chair 18 and re-lock it in place by releasing the lever.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A rotatable and transferable stanchion assembly comprising:

an elongate body having an upper end portion adapted to receive and secure thereto an accessory, and a lower end portion;

a cap mounted on the lower end portion of the body and having a lower portion with an outer external surface;

a location plate adapted to be fastened to a flat surface, said plate having a socket formed therein shaped for receiving the lower portion of the cap;

cap securing means for securing the cap to the location plate in such a position that the lower portion of the cap is disposed within the socket of the location plate, said body and cap being adapted to rotate relative to said location plate; and locking means for rotatably locking the elongate body and cap in place with respect to the location plate at a desired angle of rotation.

2. An assembly as set forth in claim 1, said locking means comprising engaging means associated with the location plate for securely engaging said cap to prevent the relative rotation of cap and body with respect to the location plate.

3. An assembly as set forth in claim 2, said engaging means comprising a locking plate pivotally connected to said location plate for engaging said cap.

4. An assembly as set forth in claim 3, said location plate having an outwardly extending flange positioned above the socket, said flange engaging the flat surface upon which the location plate is mounted, said locking plate being pivotally connected to said flange.

5. An assembly as set forth in claim 3, said locking plate having a hinge for connecting the locking plate to the location plate, and a lever for moving the locking plate between a position in which it is engages the cap and a position in which it is disengaged therefrom.

6. An assembly as set forth in claim 5, said locking plate further having an inwardly extending detent, and said cap having a circumferential flange with teeth formed thereon, said detent being received between teeth of the circumferential flange for locking the cap and body in place with respect to the location plate.

7. An assembly as set forth in claim 6, said locking plate further having spring means for biasing the locking plate in its engaged position.

8. An assembly as set forth in claim 6, said lever having a widthwise dimension greater than the widthwise dimension of said body.

9. A rotatable and transferable stanchion assembly comprising:

an elongate body having an upper end portion adapted to receive and secure thereto an accessory, and a lower end portion;

a cap mounted on the lower end portion of the body and having a lower portion with an outer external surface;

a location plate adapted to be fastened to a flat surface, said plate having a socket formed therein shaped for receiving the lower portion of the cap;

cap securing means for securing the cap to the location plate in such a position that the lower portion of the cap is disposed within the socket of the location plate, said body and cap being adapted to rotate relative to said location plate; and locking means for rotatably locking the elongate body and cap in place with respect to the location plate at a desired angle of rotation, said locking means comprising engaging means associated with the location plate for securely engaging said cap to prevent the relative rotation of cap and body with respect to the location plate;

said engaging means comprising a locking plate pivotally connected to said location plate for engaging said cap.

10. An assembly as set forth in claim 9, said location plate having an outwardly extending flange positioned above the socket, said flange engaging the flat surface upon which the location plate is mounted, said locking plate being pivotally connected to said flange.

11. An assembly as set forth in claim 9, said locking plate having a hinge for connecting the locking plate to the location plate, and a lever for moving the locking plate between a position in which it is engages the cap and a position in which it is disengaged therefrom.

12. An assembly as set forth in claim 11, said locking plate further having an inwardly extending detent, and said cap having a circumferential flange with teeth formed thereon, said detent being received between teeth of the circumferential flange for locking the cap and body in place with respect to the location plate.

13. An assembly as set forth in claim 12, said locking plate further having spring means for biasing the locking plate in its engaged position.

14. An assembly as set forth in claim 12, said lever having a widthwise dimension greater than the widthwise dimension of said body.

* * * * *